UNITED STATES PATENT OFFICE.

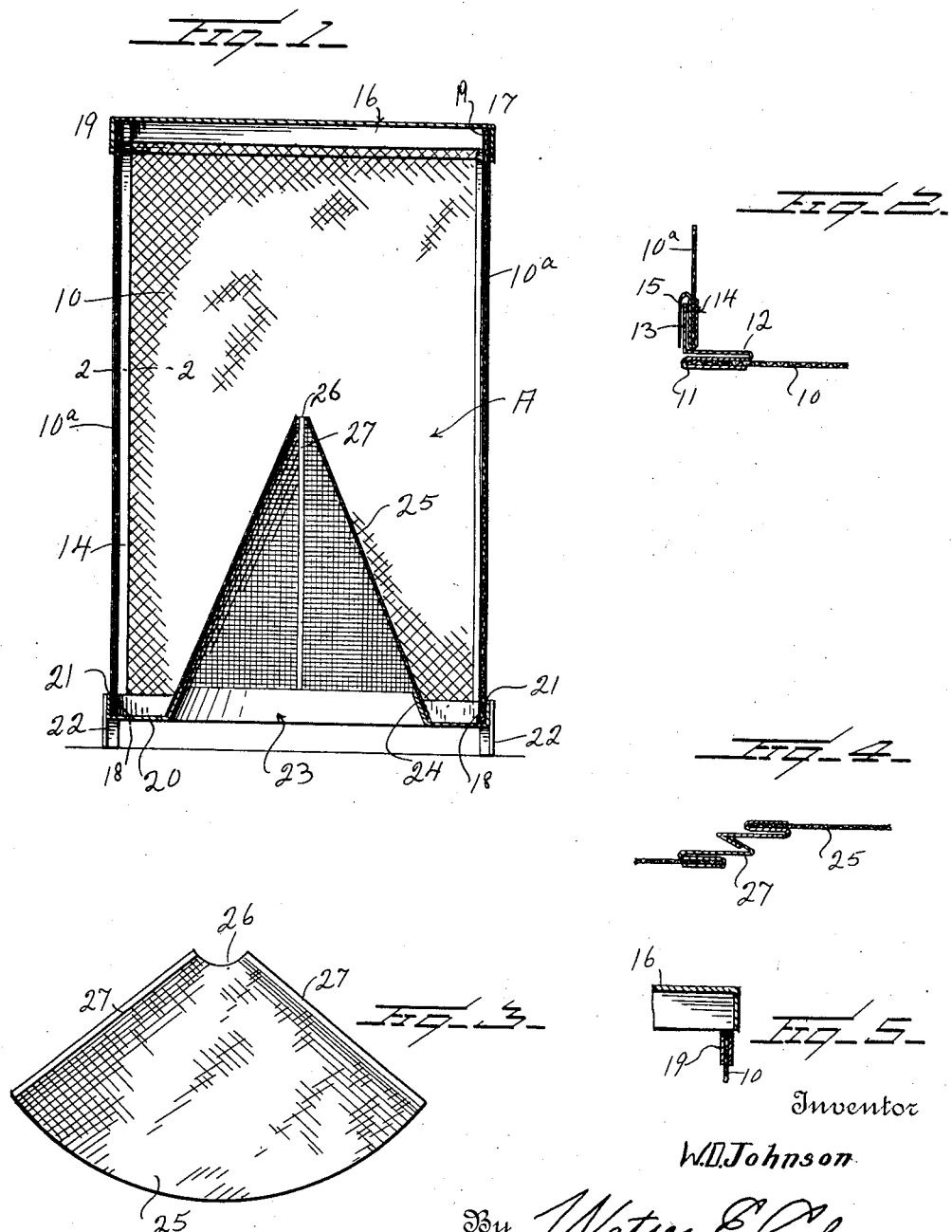

WILLIAM D. JOHNSON, OF OAKLAND, CALIFORNIA.

INSECT-TRAP.

1,347,906.  Specification of Letters Patent.  Patented July 27, 1920.

Application filed June 28, 1919. Serial No. 307,381.

*To all whom it may concern:*

Be it known that I, WILLIAM DRYBURGH JOHNSON, a citizen of the United States, residing at Oakland, in the county of Alameda and State of California, have invented certain new and useful Improvements in Insect-Traps, of which the following is a specification, reference being had to the accompanying drawings.

This invention relates to insect traps, and more particularly to a trap designed for catching flies and other insects of that character in which a casing or cage of wire netting is used having a contracted entrance opening by which the insects secure entrance to the cage, the contracted opening, however, preventing the exit of the insect from the cage.

One of the objects of this invention is to provide a trap in which the parts are detachably engaged with each other so that the various parts may be collapsed for packing and transportation.

A further object is to provide a structure of this character which may be cheaply made, which is very simple, and which may be easily set up or taken down.

Other objects will appear in the course of the following description.

My invention is illustrated in the accompanying drawings, wherein:—

Figure 1 is a vertical sectional view of my improved insect trap;

Fig. 2 is a section on the line 2—2 of Fig. 1;

Fig. 3 is a plan view of the cone 25 in its flattened condition;

Fig. 4 is a section through the cone at the joint thereof; and

Fig. 5 is a fragmentary vertical section showing the manner in which the top of the trap is connected to the side walls.

Referring to these drawings, it will be seen that the trap comprises an outer cage A, as it may be termed, having four sides, a top and a bottom, and that the bottom has a central opening and that within this cage is disposed a cone which is disposed over the central opening, this cone having a contracted opening at its apex through which the insect enters the cage.

The cage A consists of sheets 10 of wire gauze forming the sides of the cage. These sides are adapted to be detachably connected to each other and, therefore, I have provided for an interlocking engagement between the sheets. Thus, for instance, the sheet 10 has attached to its margin a sheet metal strip 11 which may be soldered or otherwise attached to the wire gauze and is folded upon itself, as at 12, and then angularly extended, as at 13. The adjacent sheet 10ª is provided with a strip 14 which is folded upon itself to embrace the sheet 10ª and then is refolded upon itself, as at 15, to provide a recess or pocket for the reception of the angular flange 13, as illustrated clearly in Fig. 2.

It will be understood that any one of the sheets forming the sides of the fly trap might be provided on one margin with the strip 11 and on another margin with the strip 14, or that one sheet may be provided on its opposite margins with strips 11 and the other coacting sheets with the strips 14. In any case, I have provided for a detachable engagement between the sheets, and the strips 11 and 14 will hold the sheets in right angular relation, while the sheet metal strips at the edges of the sheet form the corners of the completed rectangular member and act as vertical supports for the cage.

Resting upon the upper ends of the sheet 10ª is a top 16 of sheet metal, having a downwardly bent margin 17. The lower ends of the several wire gauze sheets 10 and 10ª are reinforced by a folded metallic piece 18 and the upper ends by a folded metallic piece 19. The downwardly extending flange 17 engages over the upper ends of the side sheets, thus holding the sheets in rectangular form.

The bottom of the cage consists of a rectangular piece of sheet metal 20 which has an upwardly extending, marginal flange 21 and corner legs 22 which are preferably angular in form, and its top is formed with a central, circular opening 23. The bottom around this circular opening is formed with an upwardly and inwardly extending flange 24. The sides of the cage will be disposed inward of the flange 21 and rest upon the bottom 20. This upwardly extending flange 21 holds the sides of the side walls of the cage in rectangular relation. Thus, the side walls of the cage are held in this rectangular relation by the top and by the bottom of the cage. A cone 25 is disposed within the cage, this cone being formed of wire gauze and being formed of a flat sheet of wire gauze having a sector-shape in plan, as illustrated in Fig. 3, and cut away at one corner, as at 26, to form an outlet opening. The margins of the wire gauze are provided with interlocking strips of sheet metal 27. It will be obvious now that the sector-shaped piece of wire gauze 25 may be packed flat and when it is desired to set up the trap, this sector-shaped piece is bent to form a cone, and the margins are interlocked with each other to hold the cone in its conical form over the face of this flange 24 which forms the cone support.

The legs 22 are very short so that the bottom sheet 20 is supported at a very slight distance above the table or other support for the fly trap. As a matter of fact, these legs are only about ¾" high. The object of making the legs so short is to allow but little light to filter into the space between the bottom of the trap so that this space will be relatively dark so that after the fly, moth, or other insect has eaten the bait which may be disposed between the trap, it will go up through the cone to reach the light and will not attempt to fly out or crawl out laterally. Preferably, the cone and side walls of the trap are made of wire gauze having about 14 by 33 mesh.

It will be seen that a trap constructed in accordance with my invention is thoroughly effective for the purpose of catching flies, moths, and other insects, that it is very light and cheaply constructed, and that the parts may be superposed flat upon each other and very compactly packed for shipment.

I claim:—

1. An insect trap comprising a cage having a bottom, top and side walls, the side walls being formed of sheets of wire gauze, the adjacent edges of adjacent sheets being detachably engaged with each other, the top being formed with a downwardly extending flange having detachable engagement with the top of the cage, the bottom of the cage being formed of flat sheet metal and having relatively short legs at its corners and having a central opening, and a cone made of a sector-shaped sheet of wire gauze, the side edges of the sheet having interlocking strips attached thereto, each strip at one margin being folded to provide a recess receiving the edge of the wire gauze and at the opposite margin being bent to form a hook, the two hooks being adapted to engage with each other whereby the sheet may be laid flat in packing but whereby the side edges of the sheet may be afterward engaged with each other to form a cone.

2. A trap of the character described comprising a cage, rectangular in form and having side walls of wire gauze, the sides of the cage being detachably interlocked with each other, a top of sheet metal having a marginal flange detachably engageable with the side walls of the cage, a bottom of sheet metal having a marginal flange detachably engageable with the side walls and holding these side walls in rectangular relation, the bottom being provided at its corners with legs and with a central opening having an upwardly and inwardly extending flange, and a cone comprising a sector-shaped sheet of wire gauze, the lateral edges of which having strips of sheet metal applied thereto detachably engaging each other, the upper end of the cone being cut off to provide an inlet opening at the apex of the cone, and the base of the cone being adapted to be set over said flange on the bottom.

3. An insect trap comprising a cage having a bottom, top and side walls, the side walls being made of reticulated sheets, one side margin of each sheet having attached thereto a strip of metal bent to embrace the margins of the sheet and then rebent upon itself to form a longitudinally extending socket, the opposite side margin of the sheet having attached thereto a strip of metal bent to embrace the sheet and then bent upon itself to the edge of the sheet, and then angularly bent for insertion in said socket whereby said sheets forming the side walls may have interlocking detachable engagement with each other, the upper ends of the sheets being reinforced by folded, transversely extending strips of metal, the bottom of the cage being formed with an upwardly extending flange embracing the lower ends of the side walls of the cage and being also formed with downwardly extending portions forming legs, the center of the bottom having an opening, and a detachable cone of reticulated material disposed within the cage over said opening and extending upward into the cage and having a relatively small exit opening, and a top extending over the upper ends of the sheets and detachably holding them in engagement with each other.

In testimony whereof I hereunto affix my signature in the presence of two witnesses.

WILLIAM D. JOHNSON.

Witnesses:
HOWARD J. PEIRSOL,
J. N. TURNER.